C. F. BENNETT.
SELF CLEANSING CISTERN FILTER.
APPLICATION FILED OCT. 28, 1919.
1,433,254.
Patented Oct. 24, 1922.
Fig. 1.
Fig. 2.
Fig. 3.
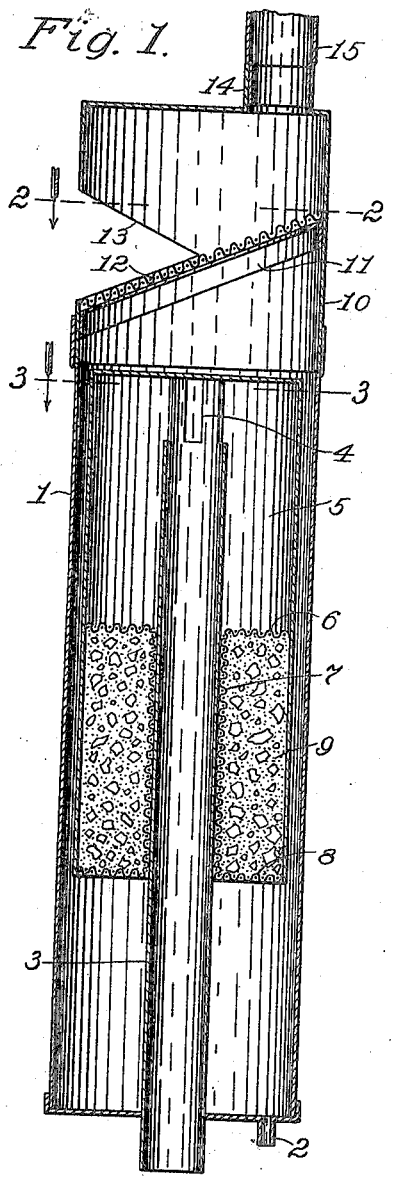
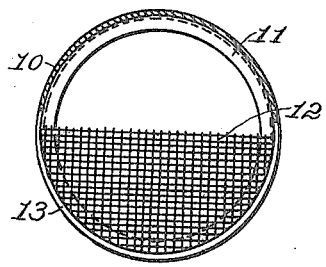
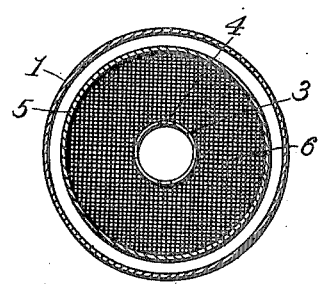
Inventor,
Charles F. Bennett, by
G. C. Kennedy,
Attorney.

Patented Oct. 24, 1922.

1,433,254

UNITED STATES PATENT OFFICE.

CHARLES F. BENNETT, OF WATERLOO, IOWA.

SELF-CLEANSING CISTERN FILTER.

Application filed October 28, 1919. Serial No. 334,047.

*To all whom it may concern:*

Be it known that I, CHARLES F. BENNETT, a citizen of the United States of America, and a resident of Waterloo, Blackhawk County, Iowa, have invented certain new and useful Improvements in Self-Cleansing Cistern Filters, of which the following is a specification.

My invention relates to improvements in self-cleansing cistern filters, and the object of my improvement is to construct a cistern filter suitably to filter water and deliver it free from impurities, and to arrange its filtering structures to automatically shed and discard without the filter the sedimental matters which tend to accumulate within the filter casing incidental to the filtering process.

This object I have accomplished by the means which are hereinafter described and claimed, and which are illustrated in the accompanying drawings, in which Fig. 1 is a vertical central and longitudinal section of my filtering device; Fig. 2 is a horizontal section thereof taken on the broken line 2—2 of said Fig. 1, looking downwardly as indicated by the arrow, and Fig. 3 is a cross horizontal section of the device, taken on the broken line 3—3 of Fig. 1, looking downwardly.

In said drawings, similar numerals of reference denote corresponding parts throughout the several views.

The filter casing 1 is of an elongated cylindrical form, open at the top, closed at the bottom, and provided in its bottom with a relatively small vent 2 for sedimentary matters.

A tube 3 of larger cross-sectional area than said vent 2 is fixed centrally in the bottom of said casing, traversing same to deliver filtered water below it to a cistern conduit not shown, the tube 3 extending upwardly centrally within said casing, with its upper open and slotted end 4 positioned a little below the top of the casing.

The numeral 5 denotes a cylindrical receiver or container for filtering material 9, placed concentrically within and spaced from the inner wall of the casing 1, in its upper part, and also spaced from the bottom of the casing, said container being removably supported upon the upper slotted end 4 of said central tube 3.

An intersticed or woven holder is placed removably within the lower half of the container 5 to contain the filtering material 9. This holder may be of any desired form, but as shown consists of a woven wire cylinder 7 removably fitting about the tube 3, and upper and lower heads 6 and 8, also of woven wire, and said parts may be united or formed integrally, as desired.

The numeral 10 denotes a hollow cylindrical top closure for the open upper end of the casing 1, fitted therein, and having an inlet-tube 14 in communication with the lower end of a downspout 15. The closure has in its cylindric wall an obliquely notched or reentrant discharge opening 13 above a sloping screen 12 of coarsely-meshed wire, the latter removably supported upon an inwardly-flanged ring 11 fixed on the inner wall of said closure, and said screen may be easily removed for cleaning or replacement. This screen serves to intercept leaves and coarse débris of any kind delivered upon it, and which matters are voided through the opening 13.

Rain water which traverses the screen 12 downwardly, passes the container 5 which has an imperforate top, and accumulates in the relatively large space in the bottom of the casing 1 below said container. As the casing fills the water head forces the water upwardly through the filtering material 9, and the water then fills the space in the upper part of the container, passing thence through the vent-openings 4, and downwardly through the tube 3 to be delivered to the cistern.

It will be observed that the relatively large spaces in the lower part of the casing, and in the upper part of the container 5 serve the following purposes. The large space in the lower part of the casing 1 becomes a reservoir for the entering water, stabilizing the water therein and permitting subsidence of such lighter matters as may have traversed the meshes of the screen 12, and also permits the precipitation of small particles of impurities or of the dust or slime from the filter, without actual accumulation thereof in the casing, as these impurities or sedimental matters are voided from the casing through the small vent-tube 2, the latter not being large enough to divert much of the water from the casing.

The large space in the upper part of the container 5 also serves as a retarding means for water received therein, so as to not carry off any light sedimental matters, which fall back on the filter. As the flow of water ceases, a quantity of water is trapped or held in the space above the filter and below the discharge vents 4 in the tube 3 and this water under the influence of gravity descends through the filter, in its course gathering and discharging with it fine sediment held by the filtering material 9, into the lower part of the casing, which water and sediment escapes through the vent-tube 2. This causes the filter to become automatically self-cleansing, and the filtering material 9 will not need renewing for a long time, which renders the device sanitary and keeps it effective, as the filter cannot become clogged up by sediment or impurities or become foul.

Having described my invention, what I claim as new, and desire to secure by Letters Patent, is:

1. In a device of the character described, a casing having a relatively small basal bent and having a top inlet-port, a container with closed top and open bottom positioned within and spaced from the walls and bottom of said casing, an intersticed receptacle for filtering material fitted removably within the lower part of said container, and a delivery-tube in communication with the upper part only of said container, and traversing said casing to deliver outwardly thereof.

2. In a device of the character described, a casing having an open top and closed bottom, the bottom having a relatively small vent, a container with closed top and open bottom supported removably within the casing spaced from the inner wall of the casing and also spaced from the bottom of the casing to provide a relatively large interspace, an intersticed receptacle for filtering material removably supported in the lower part of said container to provide a relatively large interspace between it and the top of the container, and a delivery-device traversing said casing and container and in communication only with the upper part of the last-mentioned interspace.

3. In a device of the character described, a casing having a closed bottom with a relatively small vent therein, a tube traversing said bottom and extending upwardly into the casing and having an open upper end, a container in said casing open at the bottom, closed at the top and having its top removably supported on said tube, the lower end of the container being spaced from the bottom of said casing, and a filter removably closing the lower end of said container and spaced apart from the open upper end of said tube.

4. A continuously self-cleansing filter, comprising a closed bottom open top casing having in its bottom a relatively small sediment-vent, and having an open-ended tube therein whose lower end extends through its bottom, a container removably supported upon the upper part of said tube within and spaced from said casing, said container having a closed top and open bottom, a reticulated receptacle for filtering material supported removably between said container and said tube in a position midway between the top of the casing and the bottom of the casing to provide above and below said reticulated receptacle relatively deep compartments, the upper end of said tube being in communication with the upper part of the compartment in said container above said reticulated chamber.

5. In a continuously self-cleansing filter, an open casing having a small bottom vent, a filter device supported within said casing to provide an isolated compartment above it having a discharging-conduit, and to provide a deep compartment below it in communication with said bottom vent, said vent being located to continually discharge sediment from said deep lower chamber and said filter while a liquid is transversing the filter or exhausting therefrom.

Signed at Waterloo, Iowa, this 10th day of October, 1919.

CHARLES F. BENNETT.